Feb. 10, 1931.  J. V. CIZEK  1,792,143

POWER ATTACHMENT FOR MOTOR CARS

Filed Nov. 25, 1929

INVENTOR
John V. Cizek,
BY
G.C.Kennedy
ATTORNEY

Patented Feb. 10, 1931

1,792,143

UNITED STATES PATENT OFFICE

JOHN V. CIZEK, OF CLUTIER, IOWA

POWER ATTACHMENT FOR MOTOR CARS

Application filed November 25, 1929. Serial No. 409,591.

My invention relates to improvements in power attachments for motor cars, and the object of my improvement is to supply a device of this class adapted to be actuated by frictional contacts with the driving wheel tires of motor cars, and having means for actuating singly or simultaneously different mechanical devices.

Another object is to provide a construction which is simple, and of inexpensive construction.

Figure 1:
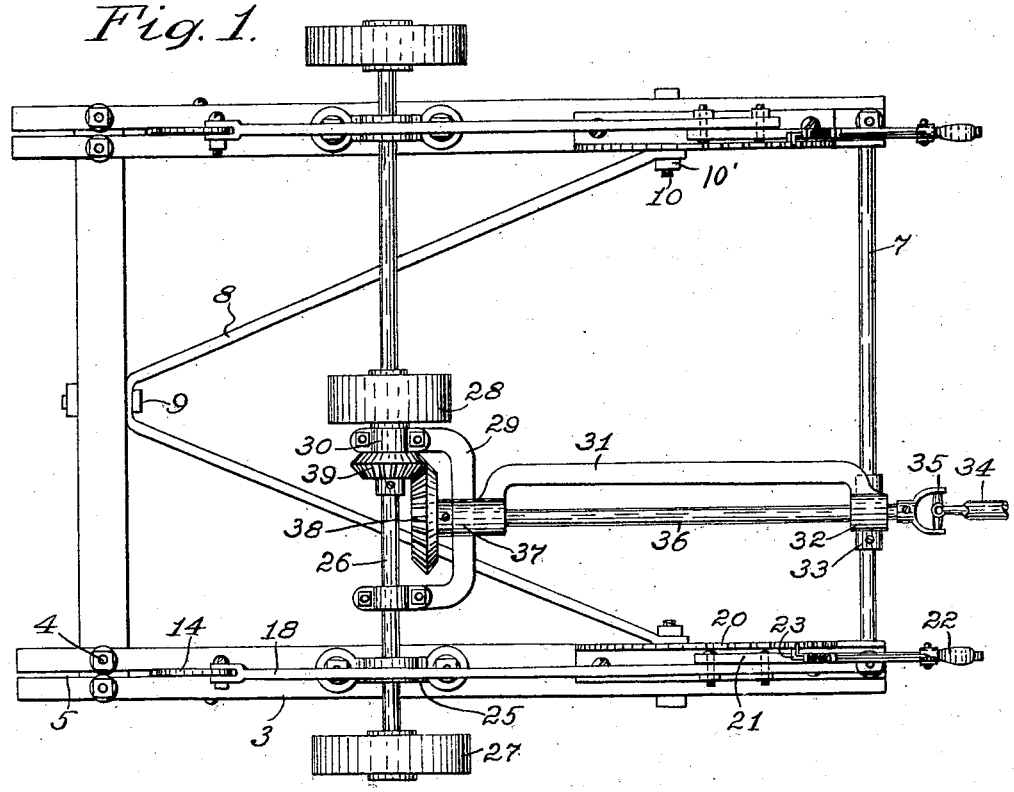
Figure 2:
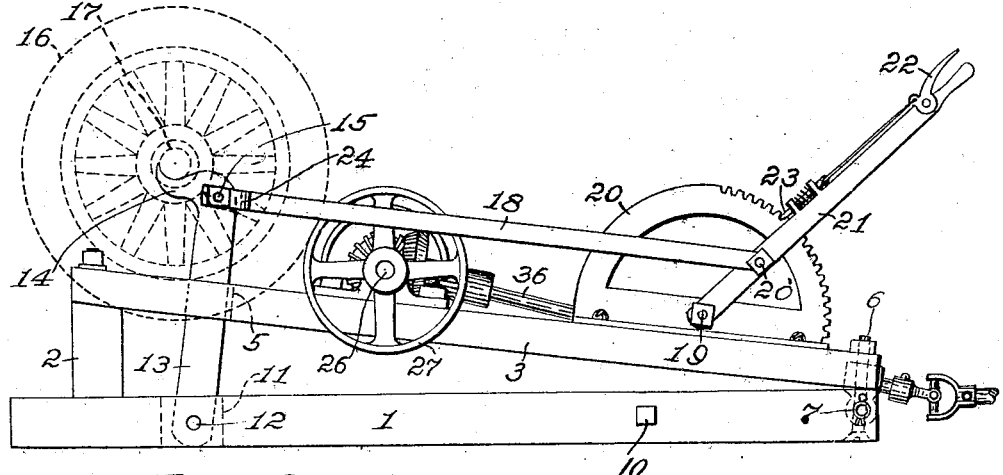

I have accomplished the above objects by the mechanism which is hereinafter described and claimed, and which is illustrated in the accompanying drawings, in which Fig. 1 is a top plan of my said power attachment, and Fig. 2 is a side elevation thereof, with the dotted lines indicating the working position of motor car driving wheels as frictionally engaged with the pair of driven wheels of said power attachment.

My invention is not restricted to the precise construction and arrangement of parts herein shown and described, nor to the various details thereof, as the same may be modified or rearranged in various particulars without departing from the spirt and scope of my invention, one practical embodiment of which has been herein illustrated and described without attempting to show all of the various forms and modifications in which my invention might be embodied.

A U-shaped base frame is used whose side beams 1 are rigidly connected at one end by a cross-beam. Short standards 2 are mounted on the end parts of the side beams and near the ends of said cross-beam, and inclined frame beams 3 are secured by threaded studs 4 and nuts to the tops of the standards 2, their opposite ends contacting with the opposite rear ends of the side beams 1 and secured thereto by bolts 6. The raised terminations (here called forward ends) of the inclined beams 3 have end slots 5 traversed by the pair of flattened arms 13 whose lower ends are likewise seated rockingly in shorter slots 11 in the side beams 1 and pivoted on pintles 12 therein. On the tops of the rear terminations of the beams 3 are fastened the pair of rack sectors 20, their teeth releasably engaged by detents 23, resiliently controlled, operable by the manually movable arms 22 on levers 21 pivoted at 19 to the rack sector center. Connecting rods 18 connected medially to the levers 21 on pintles 20' have forks 24 pivoted at 15 to the upper parts of the arms 13.

The upper terminations 14 of the swinging arms 13 are bent forwardly and have their upper edges shaped with concavities adapted to seat the axle housings 17 of the driving wheels 16 of a motor car, the driving wheels and axle housings being indicated by dotted lines in said Fig. 2.

About midway on the side beams 3 are mounted apertured bearings 25 to seat the end parts of a transverse rotatable shaft 26, upon whose terminations without said frame are secured the pair of driven wheels 27. Upon the middle of the shaft 26 is secured a belt pulley 28 for driving by means of a belt (not shown) any machine.

The numeral 29 denotes a U-shaped yoke having disassemblable bearing boxes 30 on the ends of its side members, and having a medial apertured longitudinal bearing 37 seating a rotatable shaft 36 on whose forward end within the yoke is secured a gear-wheel 38 in mesh with a smaller bevel pinion 39 secured upon the transverse shaft 26, also within said yoke. A sleeve 33 is secured upon a transverse tube 7, which latter has its terminations seated in holes in the rear ends of the side beams 1, and integral with this sleeve is a longitudinally directed apertured bearing sleeve 32 alined with the bearing 37 and traversed by said shaft 36, the latter projecting to the rear and having a universal-joint connection 35 with a tumbling-rod 34 at a low level suitable to furnish power to a threshing machine or other device. A supporting shallow U-shaped member 31 is connected between the bearings 37 and 32 to support the yoke 29. The numeral 8 denotes a V-shaped brace medially secured to the middle of the forward cross-beam of the frame by a bolt 9, and at its ends to the rear parts of the base beams 1 by bolts 10, and nuts 10'.

When the arms 21 are swung forwardly, the hooked ends of the arms 13 at 14 may be placed under the axles 17, the arms 21 then being swung rearwardly, lifting the motor car wheels 16 and contacting the treads of their tires with the driven wheels 27 to rotate the latter, thus driving the belt-wheel 28, and simultaneously the gearing 39—38, with the shaft 36 and the tumbling-rod 34. The rack-sector with the arms 21 permit adjustments of the arms 13 to wheels 16 of differing diameters.

Having described my invention, what I claim as new, and desire to secure by Letters Patent, is:

In a power attachment for a motor-car, in combination, a frame, a swinging arm pivoted thereto at each side and having their upper ends shaped to engage and releasably support the axle-housings for the driving axles of the car, rack-sectors on said frame, pivoted levers on said frame, resiliently controlled detents thereon for releasably engaging teeth of said rack-sectors respectively, links between said levers and said arms, a shaft mounted rotatably across said frame, friction-wheels on the ends of the shaft to be engaged and rotatably driven by driving wheels on said car axles when the latter are lifted therewith and moved to an appropriate position, by the operation of said levers, a belt-wheel mounted fixedly on said shaft, a gear on said shaft, a supporting member on said frame having apertured bearings, a longitudinal rotatable shaft mounted in said bearings, a gear-wheel on the latter shaft in mesh with the first-mentioned gear, and a driving connection linked to the latter shaft.

In testimony whereof I affix my signature.

JOHN V. CIZEK.